UNITED STATES PATENT OFFICE.

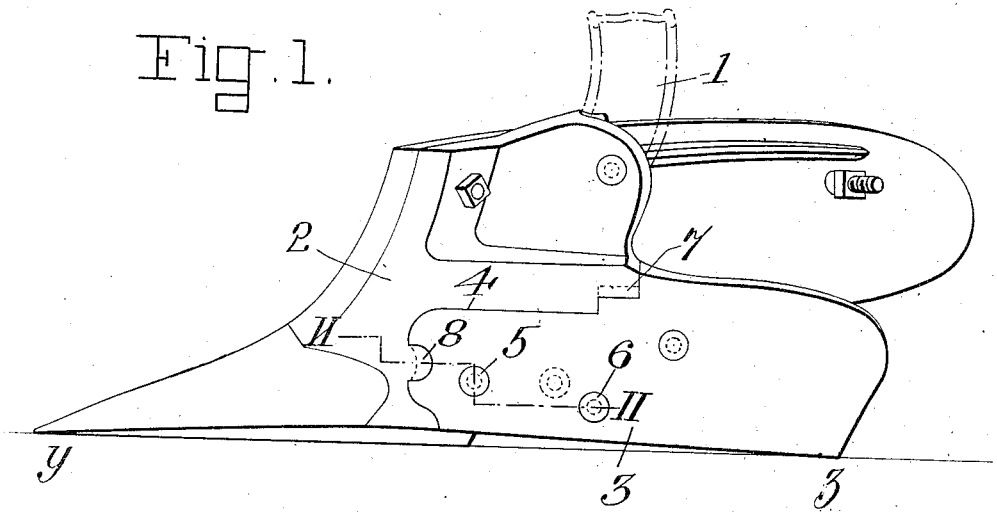
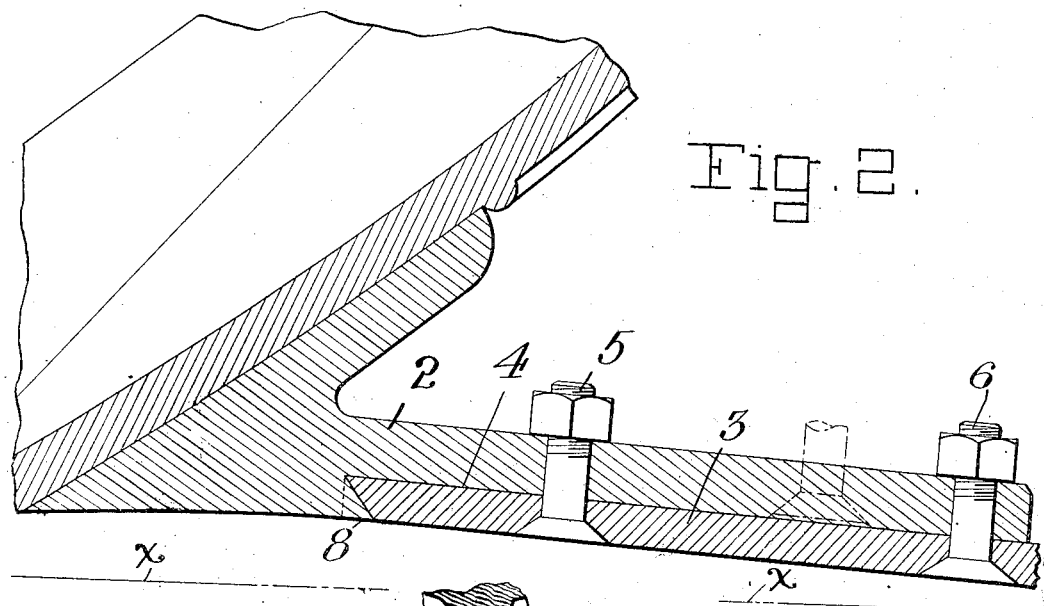
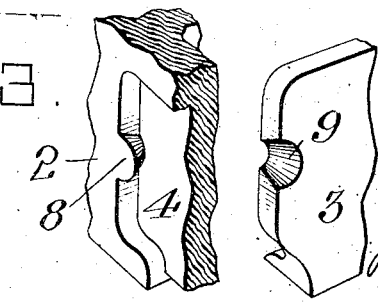

JAMES RAPHAEL ROSSETTER, OF KNOXVILLE, TENNESSEE, ASSIGNOR TO THE WM. J. OLIVER MANUFACTURING COMPANY, OF KNOXVILLE, TENNESSEE, A CORPORATION OF TENNESSEE.

PLOW.

No. 925,134.   Specification of Letters Patent.   Patented June 15, 1909.

Application filed February 8, 1909. Serial No. 476,629.

*To all whom it may concern:*

Be it known that I, JAMES RAPHAEL ROSSETTER, a citizen of the United States, residing at Knoxville, in the county of Knox and State of Tennessee, have invented certain new and useful Improvements in Plows; and I do hereby declare the following to be a full, clear, and exact description of the invention, such as will enable others skilled in the art to which it appertains to make and use the same.

This invention relates to plows having a detachable landside, and the object thereof is to prevent a plow from loosing its original "gather," *i. e.* the concave or inward curve of the landside face of the plow which causes the implement to hold to a straight line when at work. It is absolutely necessary to preserve this curve in order to keep the plow in perfect working order, for if the landside face of the plow becomes flat or slightly convex, the plow will no longer hold to a straight line but will tend to zigzag in the furrow and run out of the land. Loosing this curve has been a serious fault of all plows having a detachable landside. The landside is held to place by bolts, and when these bolts become loosened dirt is allowed to get in between the parts and push out the landside, whereby the concave is lost and the plow will not do good work. To obviate this difficulty is the aim of my invention, which I accomplish by means as hereinafter described with reference to the accompanying drawings and more particularly pointed out in the claims appended to this description.

In said drawings, which are to be taken as a part of this specification: Figure 1 is a side elevation, looking at the landside, of a plow embodying my invention. Fig. 2 is an enlarged horizontal section on line II—II of Fig. 1. Figs. 3 and 4 are detail perspective views of the interfitted parts of the plow-standard and landside.

I have illustrated in the drawings a plow of substantially the construction disclosed in my prior patents Nos. 644,099 and 740,373, wherein the plowshare and other operative parts are fitted to and secured upon a standard, frog or saddle 2, which is shown attached to the foot of the beam or standard 1 but may of course be a part of the standard itself. The landside 3 has its forward portion fitted in a lateral recess or depression 4 in the heel of the standard 2, and is fastened by the bolts 5 and 6. By the shape of said recess and interengaging shoulders between the parts at 7, as more fully explained in my first mentioned patent, the landside is firmly fitted and the bolts are practically relieved of shearing strain.

As shown in Fig. 2, where the line $x$ is a straight line touching the plow-point at $y$ and the heel of the landside at $z$, the concave of the landside face of the plow is in part produced by a slight angular disposition or lateral inclination of the landside which splays outwardly from its front to its rear end. It is the function of my present improvement to maintain the landside in such position, that is to prevent its front end from lateral displacement and keep it flush with the standard. This is effected by an interlocking connection between the front end of the landside and abutting part of the standard; a preferred means, as shown, consisting of a lug 8 in the shape of the half-part of a round countersunk bolt-head cast on the front wall of the recess 4, and a correspondingly-shaped socket or half-part of a hole 9 on the front end of the landside. When the landside is shoved forwardly into place in the recess 4 of the standard, the beveled wall of the hole 9 riding under that of the lug 8 forces the landside to its seat, making a flush joint with the standard, and the bolts 5 and 6 being then inserted and fastened secure the landside in place. Independently of the bolts, however, the undercut-lug 8 overlying the lip afforded by the half-hole 9 holds the front end of the landside rigid and absolutely prevents lateral displacement, even in the least degree; for in order to allow any lateral separation of the front of the landside from the standard the landside must first be moved rearwardly until the socket 9 is withdrawn from under the lug. Hence it will be seen that even if the bolts should work loose, the concave of the landside face of the plow would nevertheless be maintained, as the lug and socket would prevent the forward end of the landside from being pressed outward.

In casting the lug 8 on the standard, and in order to get the patterns out of the sand-mold, that portion of the mold which forms the lug is advisedly made by means of a small pattern piece, corresponding to the shape of the lug, which is set in a hole in the front end of the recess that takes the landside, and, when the mold is opened, is lifted out with a cope whereby the impression is left for the lug, as will be understood by those familiar with the art of metal casting.

I do not intend to restrict myself to the specific construction shown, but reserve the right to any equivalent means that will accomplish the desired purpose, as for example a lug on the end of the landside engaging in an undercut socket in the front wall of the recess 4.

The term "concave", as used herein, is not to be understood in a mathematical sense as denoting a surface which is strictly curved throughout, but signifies a surface which is concave in effect, as for example where the concave is produced by plain surfaces angularly disposed.

Having thus described my invention what I claim as new and desire to secure by Letters Patent is:

1. A plow having a detachable landside and means for maintaining the concave of the landside face of the plow which consists of an interlocking connection between the front end of the landside and contiguous part of the plow whereby said front end of the landside is prevented from lateral displacement.

2. A plow having a detachable landside, the plow-standard having a lateral recess in which the landside is fitted, and means preventing lateral displacement of the forward end of the landside whereby to maintain the concave of the landside face of the plow, said means consisting of a lug and socket, one on the front end of the landside and the other on the front wall of said recess, that on the latter being undercut and overlying that on the landside.

3. A plow having a detachable landside, the plow-standard having a lateral recess in which the landside is fitted, and means preventing lateral displacement of the forward end of the landside whereby to maintain the concave of the landside face of the plow, said means consisting of a lug substantially like the half part of a countersunk bolt-head on the front wall of said recess and a correspondingly shaped socket on the front end of the landside, the said lug being seated in the said socket.

In testimony whereof I affix my signature, in presence of two witnesses.

JAMES RAPHAEL ROSSETTER.

Witnesses:
GASTON O'BRIEN,
THOS. P. ROBERTS.